Feb. 3, 1931.                K. ERB                1,790,980
              DECORTICATING AND DEPULPING MACHINE
                     Filed May 17, 1929

INVENTOR
KARL ERB
BY *Karl Viertal*
ATTORNEY

Patented Feb. 3, 1931

1,790,980

UNITED STATES PATENT OFFICE

KARL ERB, OF FRANKFORT-ON-THE-MAIN-GRIESHEIM, GERMANY

DECORTICATING AND DEPULPING MACHINE

Application filed May 17, 1929, Serial No. 363,835, and in Germany September 12, 1927.

The invention relates to improvements in machines for decorticating the leaves of Yuccacænas and Dracænas and like fibre containing plants which are known to have skins of a very tough and leathery nature, difficult to decorticate.

In the art of decorticating fibrous plants machines are known in which a relatively long section of the leaves is at one stroke subjected to the decorticating action of rotary scraping drums, the leaves being supported at their back by concave blocks or breast plates surrounding a relatively large circumferential area of the said drums and presenting to the latter a smooth or ondulated surface.

As a matter of fact in machines of this type the fibres of the leaves of Yuccacænas, Dracænas and the like under treatment are liable to be excessively strained so as to be torn and broken into relatively short strands of little commercial value.

It has already been proposed to eliminate the risk of breaking the fibres by associating each of the scraping drums with a counterdrum in such manner that the leaves are decorticated on both sides simultaneously while only a very narrow section of the leaves is at one time subjected to the action of the scraping drums.

However the provision of two pairs of scraping drums considerably increases the cost of manufacturing decorticating machines of said type and maintaining them in repair and calls also for a rather costly and complicated adjusting mechanism for controlling the distance of the scraping drums from each other in view of the varying thickness of the leaves under treatment. Moreover with machines in which the leaves are decorticated on both sides simultaneously by scraping drums cooperating with counter scraping drums it is impossible in practice to completely and cleanly decorticate the leaves of Yuccacænas and like fibre containing plants having extremely tough skins. My experiments have shown that those sections of the leaves which extend along their circumferential edges and which as a rule are only thinly coated with leathery tissue or rinds are not effectively attacked by the scraping drums and that the rinds can not be completely removed. I attribute this drawback to the fact that the leaves are not appropriately supported during the reciprocative scraping and supporting action of the drums and their counterdrums in as much as the latter present convex supporting faces to each other.

Decorticating machines are known having a leaf supporting member of relatively small width when compared with the circumference of the stripping drum.

It has been common practice with machines of this type—(as known from U. S. Patent 1,677,076)—when used for decorticating the leaves of Yuccacænas and like fibre containing plants to feed the leaves in their longitudinal i. e. fibre-direction downwardly into the treating space of the machine and withdrawing them upwardly in their fibre direction.

By this manipulation of the leaves however valuable time is lost i. e. while the leaves are withdrawn, resulting in a reduced output of the machine, and the leaves are liable not to be cleanly decorticated. Attempts to overcome this drawback by feeding the Yuccacæna leaves in one direction only through the treating space of the machine and by bringing the leaf supporting member nearer to the stripping drum, thus reducing the width of the treating space have failed in as much as the fibres of the leaves were overstrained and broken into short strands of no commercial value.

My invention aims at overcoming the drawbacks inherent to both kinds of decorticating machines referred to above by providing an improved leaf backing or supporting member of simple design which can be made at relatively low cost, and can be fitted into existing machines.

My experiments have shown that good results in decorticating Yuccacæna and kindred fibrous leaves are obtained by using a leaf supporting member of relatively small width when compared with the circumference of the respective stripping drum, providing said leaf supporting member with ledges spaced from each other and projecting from its working face, and by cooperatively associating the leaf supporting member with the stripping drum in such manner that the leaves can be introduced transversally to their fibre direction into the treating space of the machine and are withdrawn therefrom in their fibre direction.

The nature and scope of the invention are briefly outlined in the appended claims and will be more fully understood by the following specification taken together with the accompanying drawing in which:

Figure 2:
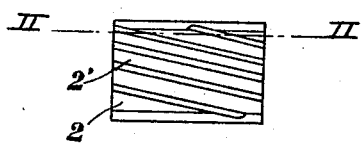
Fig. 2 is a front elevation of the leaf supporting member cooperating with the stripping drum, shown in Fig. 1.
Figure 3:
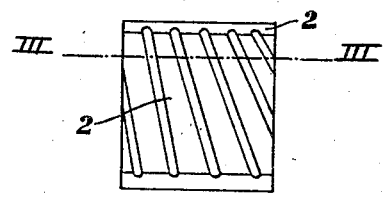
Fig. 3 shows a structurally modified leaf supporting member in front elevation.
Figure 5:
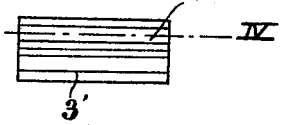

Attention is drawn to the dot and dash lines in II—II, III—III, IV—IV in Figs. 2, 3 and 5 indicating the position of the axis of the drums relatively to the respective leaf supporting members.

Figure 1:
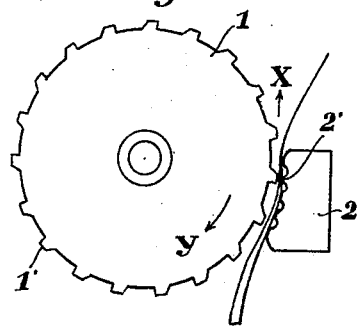
Fig. 1 is a side elevation of the stripping drum and the leaf supporting member of improved design.

Referring to Figs. 1-3 the stripping drum 1, adapted to rotate in the direction of arrow y, is provided at its cylindrical face with scraping knives 1', cooperating with a leaf supporting member 2. The latter is provided at its frontal face, opposed to the knives 1', with a plurality of projections 2' which may be ledges, cams, ridges or the like, and which may be arranged in more or less oblique direction relatively to the axis of the stripping drum 1, as seen in Figs. 1, 2 and 3, or may extend parallel to said axis, as seen in Fig. 5. With the leaf supporting member shown in Fig. 3, the said projections 2' are arranged in diverging position relatively to each other.

The distance between the knives 1' of the drum 1 and the said projections 2' preferably decreases gradually viz. following the direction of arrow X, in which direction the leaves B are drawn out of the machine.

I prefer to make the various individual projections of one and the same leaf supporting member of different width, and also to make the working face of each projection of varying width in their longitudinal direction.

Figure 4:
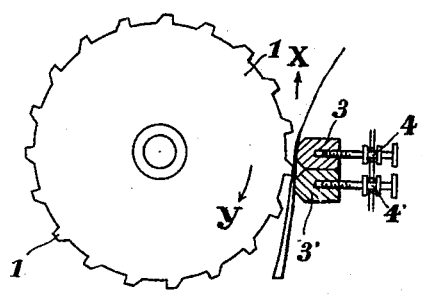
Figs. 4 and 5 show another structurally modified leaf supporting member in side and front elevation respectively.

Referring to the structurally modified leaf supporting member, shown in Fig. 4, the latter is composed of a plurality of counterbeams 3, 3', which are preferably adjustably mounted on brackets—not shown—by means of screws 4, 4'. The said counterbeams 3, 3' are of polygonal cross section viz. presenting a plurality of edges at their frontal faces.

By means of screws 4, 4' the counterbeams 3, 3' may be shifted towards or withdrawn from the stripping drums independently of each other, thus controlling the width of the working spaces, between the counterbeams and the drum.

My experiments have shown that by providing a plurality of projections 2' at each abutment member or a plurality of counterbeams 3, 3' respectively the leaves are more uniformly and thoroughly decorticated and depulped by several successive operations.

Another important effect warranting the application of projections, cams, teeth, such as described above, lies in the fact that the working space, viz. the distance between the drum and its leaf supporting member may be conveniently enlarged, which insures of the leaves being more gently and savingly treated in the decorticating and depulping operation and a maximum quantity of long valuable fibres being obtained.

It should be understood that various changes and modifications may be made in the construction and design of decorticating and depulping machines described above and in the assemblage and cooperation of their component parts, without substantially departing from the spirit and the salient ideas of my invention and without sacrificing any of the advantages referred to hereinbefore.

The leaf supporting member 2 shown in Fig. 1 may also be provided with adjusting means such as screws etc. for controlling the width of the working space between the drum and the abutment.

What I claim is:

1. In a machine for decorticating the leaves of Yuccacænas, Dracænas and like fibre containing plants the combination with a rotary stripping drum of a leaf supporting member of relatively small width when compared with the circumference of the stripping drum, of ledges which are spaced from each other and are attached to said leaf supporting member so as to project from the working face of the latter.

2. A leaf decorticating machine having the features outlined in claim 1, in which the leaf supporting member is composed of a plurality of sections, means being provided for adjusting each section independently of each other in their working position relatively to the scraping drum.

3. A leaf decorticating machine having the features outlined in claim 1, in which the ledges of the leaf supporting member are arranged in diverging position relatively to each other (Fig. 3).

4. A leaf decorticating machine having the features outlined in claim 1, in which the ledges of the leaf supporting member are arranged in inclined position relatively to the axis of the scraping drum (Fig. 2).

5. A leaf decorticating machine having the features outlined in claim 1, in which the ledges of the leaf supporting member are differently spaced apart from each other (Fig. 2).

In testimony whereof I have signed my name to this specification.

KARL ERB.